US011226451B2

(12) United States Patent
Park et al.

(10) Patent No.: US 11,226,451 B2
(45) Date of Patent: Jan. 18, 2022

(54) THREE-DIMENSIONAL OPTICAL SWITCH

(71) Applicant: ELECTRONICS AND TELECOMMUNICATIONS RESEARCH INSTITUTE, Daejeon (KR)

(72) Inventors: Jaegyu Park, Daejeon (KR); Gyung Ock Kim, Daejeon (KR); Jiho Joo, Sejong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 36 days.

(21) Appl. No.: 16/750,942

(22) Filed: Jan. 23, 2020

(65) Prior Publication Data

US 2020/0241209 A1 Jul. 30, 2020

(30) Foreign Application Priority Data

Jan. 24, 2019 (KR) .......................... 10-2019-0009285

(51) Int. Cl.
  *G02B 6/35* (2006.01)
  *G02B 6/12* (2006.01)
  *G02B 26/08* (2006.01)
  *G02B 26/06* (2006.01)

(52) U.S. Cl.
  CPC ....... *G02B 6/3556* (2013.01); *G02B 6/12002* (2013.01); *G02B 6/3594* (2013.01); *G02B 26/06* (2013.01); *G02B 26/08* (2013.01)

(58) Field of Classification Search
  CPC .. G02B 6/3556; G02B 6/3594; G02B 6/3596; G02B 6/12002
  See application file for complete search history.

(56) References Cited

U.S. PATENT DOCUMENTS 6,411,765 B1* 6/2002 Ono .................. G02B 6/12002
                                                        385/129
6,738,541 B2* 5/2004 Hoke .................... G02F 1/3132
                                                        385/17
(Continued)

FOREIGN PATENT DOCUMENTS

CN   106324865 A  *  1/2017  ............... G02F 1/00
JP   H06-214275 A     8/1994
(Continued)

OTHER PUBLICATIONS

Qihang Zhang et al., "Broadband nonvolatile photonic switching based on optical phase change materials: beyond the classical figure-of-merit," Opt. Lett. vol. 43, No. 1, pp. 94-97 (2018) (Year: 2018).*

(Continued)

*Primary Examiner* — Daniel Petkovsek
(74) *Attorney, Agent, or Firm* — Rabin & Berdo, P.C.

(57) ABSTRACT

A 3D optical switch for transferring an optical signal between a plurality of layers of an optical integrated circuit, which comprises: a first optical coupler for distributing the optical signal input to a first optical waveguide deployed in a first layer among the plurality of layers to a second optical waveguide deployed in a second layer different from the first layer; a phase shifter for changing a phase of a first optical signal in the first optical waveguide passing through the first optical coupler and a phase of a second optical signal in the second optical waveguide distributed by the first optical coupler; and a second optical coupler for combining the first optical signal of which the phase is changed and the second optical signal of which the phase is changed is provided.

8 Claims, 12 Drawing Sheets

(56) References Cited

U.S. PATENT DOCUMENTS

| | | |
|---|---|---|
| 6,785,449 B2 | 8/2004 | Lee et al. |
| 7,336,854 B2 | 2/2008 | Toyoda et al. |
| 7,387,913 B2 * | 6/2008 | Yoshimura ......... G02B 6/12002 257/E21.499 |
| 7,860,358 B2 * | 12/2010 | Tsuda .................... G02F 1/3132 385/16 |
| 9,335,474 B2 | 5/2016 | Han et al. |
| 2011/0116740 A1 | 5/2011 | Han et al. |

FOREIGN PATENT DOCUMENTS

| | | | | |
|---|---|---|---|---|
| JP | 2002-258082 A | | 9/2002 | |
| JP | 2009128718 A | * | 6/2009 | ............. G02F 1/313 |
| KR | 10-2003-0024050 A | | 3/2003 | |
| KR | 10-2003-0088301 A | | 11/2003 | |
| KR | 10-0876503 B1 | | 12/2008 | |

OTHER PUBLICATIONS

Alberto Parini et al., "Vertical link solutions for multilayer optical-networks-on-chip topologies", Optical and Quantum Electronics, pp. 385-396, Nov. 8, 2013.

Demis John et al., "Multilayer Platform for Ultra-Low-Loss Waveguide Applications", IEEE Photonics Technology Letters, vol. 24, No. 11, pp. 876-878, Mar. 5, 2012.

Muhammad Umar Khan et al., "Multi-level single mode 2D polymer waveguide optical interconnects using nano-imprint lithography", Optics Express, vol. 23, No. 11, pp. 14630-14639, May 27, 2015.

\* cited by examiner

THREE-DIMENSIONAL OPTICAL SWITCH

CROSS-REFERENCE TO RELATED APPLICATION

This application claims priority to and the benefit of Korean Patent Application No. 10-2019-0009285 filed in the Korean Intellectual Property Office on Jan. 24, 2019, the entire contents of which are incorporated herein by reference.

BACKGROUND OF THE INVENTION

(a) Field of the Invention

The present disclosure relates to a three-dimensional (3D) optical switch transferring an optical signal between a plurality of layers in an optical integrated circuit.

(b) Description of the Related Art

Requirements for high integration of semiconductor integrated circuits are increasing due to the demand for portability of computers or smart devices and the rapid increase in computational capacity and data capacity. In order to meet these requirements, the density of two-dimensional (2D) semiconductor chips is increasing. However, the density of semiconductor circuits is not continuously increasing due to various factors and the degree of integration is saturated.

The above information disclosed in this section is only for enhancement of understanding of the background and therefore it may contain information that does not form the prior art that is already known in this country to a person of ordinary skill in the art.

SUMMARY OF THE INVENTION

An exemplary embodiment provides a three-dimensional (3D) optical switch for transferring an optical signal between a plurality of layers in an optical integrated circuit.

Another embodiment provides another 3D optical switch for transferring an optical signal between a plurality of layers in an optical integrated circuit.

Yet another embodiment provides another a 3D optical switch for transferring an optical signal between a plurality of layers in an optical integrated circuit.

According to an exemplary embodiment, a 3D optical switch for transferring an optical signal between a plurality of layers in an optical integrated circuit is provided. The 3D optical switch includes: a first optical coupler for distributing the optical signal input to a first optical waveguide deployed in a first layer among the plurality of layers to a second optical waveguide deployed in a second layer different from the first layer; a phase shifter for changing a phase of a first optical signal in the first optical waveguide passing through the first optical coupler and a phase of a second optical signal in the second optical waveguide distributed by the first optical coupler; and a second optical coupler for combining the first optical signal of which the phase is changed and the second optical signal of which the phase is changed.

The first optical waveguide and the second optical waveguide may be arranged side by side in a first direction in each of the first optical coupler and the second optical coupler and the first direction may be a direction perpendicular to the first layer and the second layer.

The first optical waveguide and the second optical waveguide may be deployed to be spaced apart by a predetermined interval in a second direction in the phase shifter and the second direction may be perpendicular to each of the first direction and an input direction in which the optical signal is input to the first optical waveguide.

The phase shifter may include: a heater for transferring heat to the first optical waveguide and the second optical waveguide so that a refractive index of the first optical signal and a refractive index of the second optical signal are changed, wherein the heater is located on top of the first optical waveguide and the second optical waveguide, respectively; and an electrode for transferring electrical energy to the heater so that the heater generates the heat by using the electrical energy.

The first optical waveguide and the second optical waveguide may be bent at the first optical coupler and the second optical coupler such that a distance between the first optical waveguide and the second optical waveguide is smaller than a predetermined distance.

The first optical waveguide and the second optical waveguide may be arranged to be spaced apart by a predetermined interval in a first direction and a second direction, respectively, the first optical waveguide and the second optical waveguide may be bent in a direction away from each other, the first direction may be perpendicular to the first layer and the second layer, and the second direction may be perpendicular to each of the first direction and an input direction in which the optical signal is input to the first optical waveguide.

The first optical coupler may include a first multi-mode interference unit configured to distribute the optical signal input to the first optical waveguide to the second optical waveguide and space the first optical waveguide and the second optical waveguide out in a predetermined interval, wherein one end of the first multi-mode interference unit is coupled to the first optical waveguide and the other end of the first multi-mode interference unit is coupled to the second optical waveguide, and the second optical coupler may include a second multi-mode interference unit configured to combine the first optical signal and the second optical signal and space the first optical waveguide and the second optical waveguide out in a predetermined interval, wherein one end of the second multi-mode interference unit is coupled to the first optical waveguide and the other end of the second multi-mode interference unit is coupled to the second optical waveguide.

According to another exemplary embodiment, a 3D optical switch for transferring an optical signal between a plurality of layers in an optical integrated circuit is provided. The 3D optical switch includes: a first optical switching unit for transferring a first optical signal input to a first optical waveguide deployed in a first layer of the plurality of layers to a second optical waveguide deployed in a second layer adjacent to the first layer; and a second optical switching unit for transferring a second optical signal input from the first optical switching unit to a third optical waveguide deployed in a third layer adjacent to the second layer.

Each of the first optical switching unit and the second optical switching unit may include: a third optical coupler for distributing an input optical signal to an optical waveguide deployed in an adjacent layer; a phase shifter for changing a phase of a third optical signal from the third optical coupler and a phase of a fourth optical signal distributed by the third optical coupler; and a fourth optical coupler for combining the third optical signal of which the phase is changed and the fourth optical signal of which the phase is changed.

Two optical waveguides deployed on different layers may be arranged in a first direction in each of the third optical coupler and the fourth optical coupler and the first direction may be perpendicular to the different layers, respectively.

Two optical waveguides deployed on different layers may be arranged to be spaced apart by a predetermined interval in a second direction in the phase shifter and the second direction may be perpendicular to each of the first direction and an input direction of the input optical signal.

Two optical waveguides deployed on different layers may be arranged to be spaced apart by a predetermined interval in a first direction in each of the third optical coupler and the fourth optical coupler, the two optical waveguides may be formed by bending such that a distance between the two optical waveguides is smaller than a predetermined distance, and the first direction may be perpendicular to the different layers, respectively.

Two optical waveguides deployed on different layers may be spaced apart from each other by a predetermined interval in a first direction and a second directions in the phase shifter, respectively, the two optical waveguides may be bent in a direction away from each other, the first direction is perpendicular to the different layers, and the second direction may be perpendicular to each of the first direction and an input direction of the input optical signal.

According to yet another exemplary embodiment, a 3D optical switch for transferring an optical signal between N layers of an optical integrated circuit is provided. The 3D optical switch includes: a horizontal optical switching unit for transmitting a first optical signal input to a first horizontal optical waveguide deployed in a first layer of the N layers to a second horizontal optical waveguide deployed in the first layer; and a vertical optical switching unit for transmitting a second optical signal input from the horizontal optical switching unit to a first vertical optical waveguide deployed on a second layer different from the first layer.

The horizontal optical switching unit and the vertical optical switching unit may include N×N input ports and output ports, and the N output ports of the horizontal optical switching unit may be connected to the N input ports of the vertical optical switching unit.

DETAILED DESCRIPTION OF THE EMBODIMENTS

In the following detailed description, only certain exemplary embodiments of have been shown and described, simply by way of illustration. As those skilled in the art would realize, the described embodiments may be modified in various different ways, all without departing from the spirit or scope of. Accordingly, the drawings and description are to be regarded as illustrative in nature and not restrictive. Like reference numerals designate like elements throughout the specification.

In addition, unless explicitly described to the contrary, the word "comprise" and variations, such as "comprises" or "comprising", will be understood to imply the inclusion of stated elements but not the exclusion of any other elements.

Figure 1:
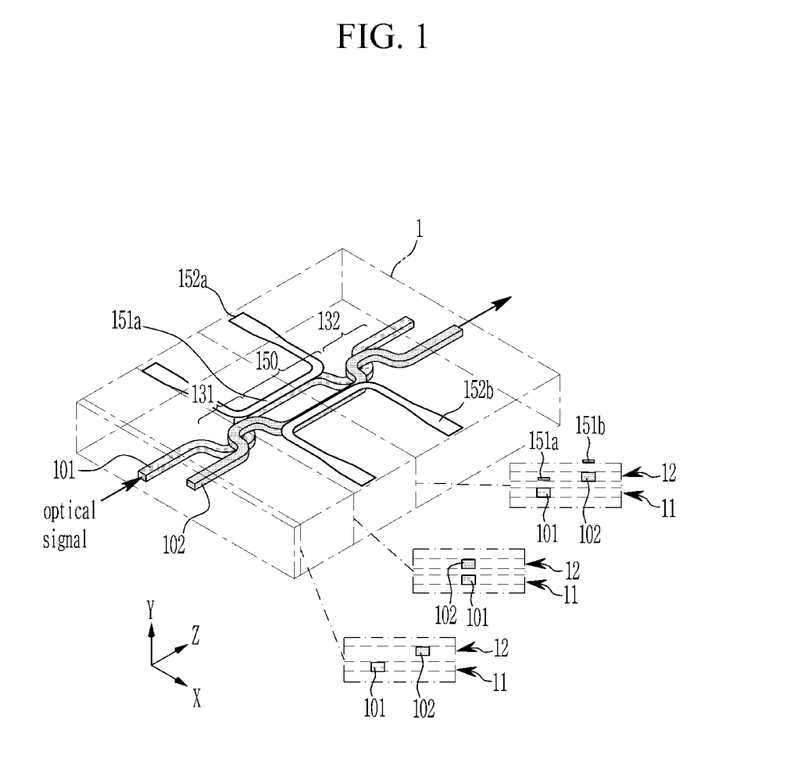
FIG. 1 is a schematic diagram illustrating a vertical directional coupler (DC) based 2×2 channel three dimensional (3D) optical switch according to an exemplary embodiment.

FIG. 1 is a schematic diagram illustrating a vertical directional coupler (DC) based 2×2 channel three dimensional (3D) optical switch according to an exemplary embodiment. A vertical directional coupler (DC) based 2×2 channel 3D optical switch according to an exemplary embodiment may be implemented in 3D photonic integrated circuits (PICs) 1 in which two layers are stacked.

Referring to FIG. 1, the vertical directional coupler (DC) based 2×2 channel 3D optical switch according to the exemplary embodiment includes a first optical coupler 131, a phase shifter 150, and a second optical coupler 132. A vertical Mach-Zehnder interferometer (MZI) may be implemented by the first optical coupler 131, the phase shifter 150, and the second optical coupler 132.

The first optical coupler 131 may distribute an optical signal input to a first optical waveguide 101 deployed in a first layer 11 of a plurality of layers to a second optical waveguide 102 deployed in a second layer 12 which is different from the first layer 11. The phase shifter 150 may change a phase of a first optical signal in the first optical waveguide 101 passing through the first optical coupler 131 and a phase of a second optical signal in the second optical waveguide 102 distributed by the first optical coupler 131. The second optical coupler 132 may combine the first optical signal of which the phase is changed by the phase shifter 150 and the second optical signal of which the phase is changed by the phase shifter 150.

The first optical coupler 131 may operate as a beam splitter which distributes optical signals. The phase shifter 150 may operate as a phase shifter which changes the phase of the optical signal. The second optical couplers 132 may operate as a beam combiner which combines the optical signals.

In an exemplary embodiment, a first optical waveguide 101 and a second optical waveguide 102 may arranged side by side in a first direction in the first optical coupler 131 and the second optical coupler 132. The first direction may be a direction perpendicular to the layers 11 and 12 in which the first optical waveguide 101 and the second optical waveguide 102 are deployed, respectively. The first direction may be the y-axis direction.

The first optical waveguide 101 and the second optical waveguide 102 may be formed to be bent at the first optical coupler 131 and the second optical coupler 132 such that a distance between the first optical waveguide 101 and the second optical waveguide 102 is smaller than a predetermined distance. The predetermined distance may vary by the design constraints. For example, the first optical waveguide 101 and the second optical waveguide 102 may coincide with each other on the y-axis, and the interlayer spacing between the first optical waveguide 101 and the second optical waveguide 102 may be about one layer thickness of an integrated circuit.

In the exemplary embodiment, in the first optical coupler 131 and the second optical coupler 132, the first optical waveguide 101 and the second optical waveguide 102 may form an evanescent coupling. For example, any one of the first optical waveguide 101 and the second optical waveguide 102 may be formed to extend over the other waveguide. Through the coupling between the first optical waveguide 101 and the second optical waveguide 102, the optical signal can be distributed.

In the exemplary embodiment, in the first optical coupler 131 and the second optical coupler 132, the y-axis spacing between the first optical waveguide 101 and the second optical waveguide 102 may be 1 µm or less.

In the exemplary embodiment, in the phase shifter 150, the first optical waveguide 101 and the second optical waveguide 102 may be deployed to be spaced apart by a predetermined interval in a second direction, and the second direction may be perpendicular to each of the first direction (y-axis direction) and an input direction in which the optical signal is input to the first optical waveguide 101 (z-axis direction). The second direction may be an x-axis direction.

The phase shifter 150 may include heaters 151a and 151b and electrodes 152a and 152b. Alternatively, the phase shifter 150 may be configured by applying an electric field to a photoelectric conversion material such as Lithium Niobate (LiNbO$_3$). The refractive index of the photoelectric conversion material may be controlled by varying an intensity of the electric field applied to the photoelectric conversion material. Alternatively, the phase shifter 150 may be configured by injecting carriers into a single crystal material such as silicon or Indium Phosphide (InP). The refractive index of the crystal material may be controlled based on the number of the carriers doped to the material. A pn junction may be used in the doping scheme.

Each of the heaters 151a and 151b may be located to be spaced apart from each other by a predetermined interval on top of the first optical waveguide 101 and the second optical waveguide 102. The heaters may transfer heat to the first optical waveguide 101 and the second optical waveguide 102 so that a refractive index of the first optical signal and a refractive index of the second optical signal are changed.

Each of the electrodes 152a and 152b may transfer electrical energy to the heaters 151a and 151b so that the heaters 151a and 151b generates the heat by using the electrical energy.

The first optical waveguide 101 and the second optical waveguide 102 may be arranged to be spaced apart by a predetermined interval in the first direction and the second direction, respectively, and the first optical waveguide 101 and the second optical waveguide 102 may be bent in a direction away from each other. The first direction may be perpendicular to the layers (11, 12) in which the first optical waveguide 101 and the second optical waveguide 102 are deployed. The second direction may be perpendicular to each of the first direction (y-axis direction) and the input direction in which the optical signal is input to the first optical waveguide 101 (z-axis direction). The second direction may be an x-axis direction.

The optical signal input to the first optical waveguide 101 may be divided into two signals by the first optical coupler 131, and the phases of the two divided signals may be changed by the phase shifter 150. The two signals whose phases are changed are reinforced by constructive interference or canceled by destructive interference at the second optical coupler 132. It is possible to switch the optical signals between the optical waveguides located in different layers.

Figure 2:
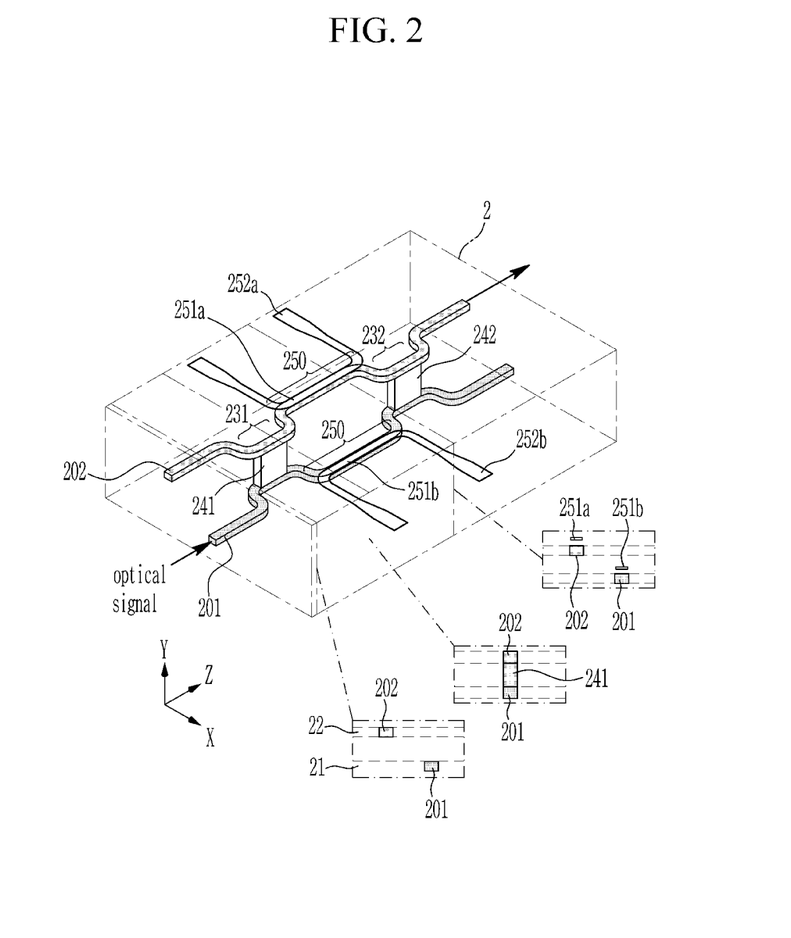
FIG. 2 is a schematic diagram illustrating a vertical multi-mode interference (MMI) based 2×2 channel 3D optical switch according to an exemplary embodiment.

FIG. 2 is a schematic diagram illustrating a vertical multi-mode interference (MMI) based 2×2 channel 3D optical switch according to an exemplary embodiment. The vertical multi-mode interference (MMI) based 2×2 channel 3D optical switch according to the exemplary embodiment may be implemented in a 3D PIC 2 having two layers stacked thereon.

Referring to FIG. 2, the vertical multi-mode interference (MMI) based 2×2 channel 3D optical switch according to the exemplary embodiment may include a first optical coupler 231, a phase shifter 250, and a second optical coupler 232.

The first optical coupler 231 may include a first multi-mode interference unit 241, and the second optical coupler 232 may include a second multi-mode interference unit 242.

The first multi-mode interferer 241 and the second multi-mode interferer 242 may operate as beam splitters or beam combiners.

The first multimode interferer 241 and the second multi-mode interferer 242 may include a first optical waveguide 201, a specific material, and a second optical waveguide 202. The specific material may be the same material as the first optical waveguide 201 and the second optical waveguide 202. Since the first multi-mode interferer 241 and the second multi-mode interferer 242 have a large cross-sectional area, there may be a plurality of allowed optical modes. For example, when an optical signal input to the first optical waveguide 201 reaches the first multi-mode interference unit 241, various optical modes may be generated by a sudden change. Then, interference between the various optical modes may be generated. Due to the interference, intensity of the optical modes at a specific position may be split in half, thereby a focus may be formed on a specific space of the first multi-mode interferer 241. In this case, the first multi-mode interferer 241 and the second multi-mode interferer 242 may be used as a 50:50 optical splitter.

In the exemplary embodiment, the first multi-mode interference unit 241 may distribute the optical signal input to the first optical waveguide 201 to the second optical waveguide 202, and the second multi-mode interference unit 242 may combine the optical signal of the first optical waveguide 201 and the optical signal of the second optical waveguide 202 which pass through the phase shifter 250.

One ends of the first multi-mode interference unit 241 and the second multi-mode interference unit 242 may be coupled to the first optical waveguide 201 and the other ends of the first multi-mode interference unit 241 and the second multi-mode interference unit 242 may be coupled to the second optical waveguide 202, so that the first multi-mode interference unit 241 and the second multi-mode interference unit 242 are configured to space the first optical waveguide 201 and the second optical waveguide 202 out in a predetermined interval.

The first multi-mode interferer 241 and the second multi-mode interferer 242 may further increase an interlayer distance between the layers than that of the 3D optical switch illustrated in FIG. 1. When the interlayer distance between the layers is sufficiently increased so that there is no interference between the optical signals in each layer, the degree of freedom in designing and arranging the photonic elements of each layer can be increased and the space utilization of each layer can be improved.

In the exemplary embodiment, in the first optical coupler 231 and the second optical coupler 232, the y-axis interval between the first optical waveguide 201 and the second optical waveguide 202 may be 1 µm or more and several µm or less.

Since the bent structures of the phase shifter 250, the first optical waveguide 201, and the second optical waveguide 202 of FIG. 2 are identical to the bent structures of the phase shifter 150, the first optical waveguide 101, and the second optical waveguide 102 of the 3D optical switch illustrated in FIG. 1, detailed description thereof will be omitted.

Figure 3A:
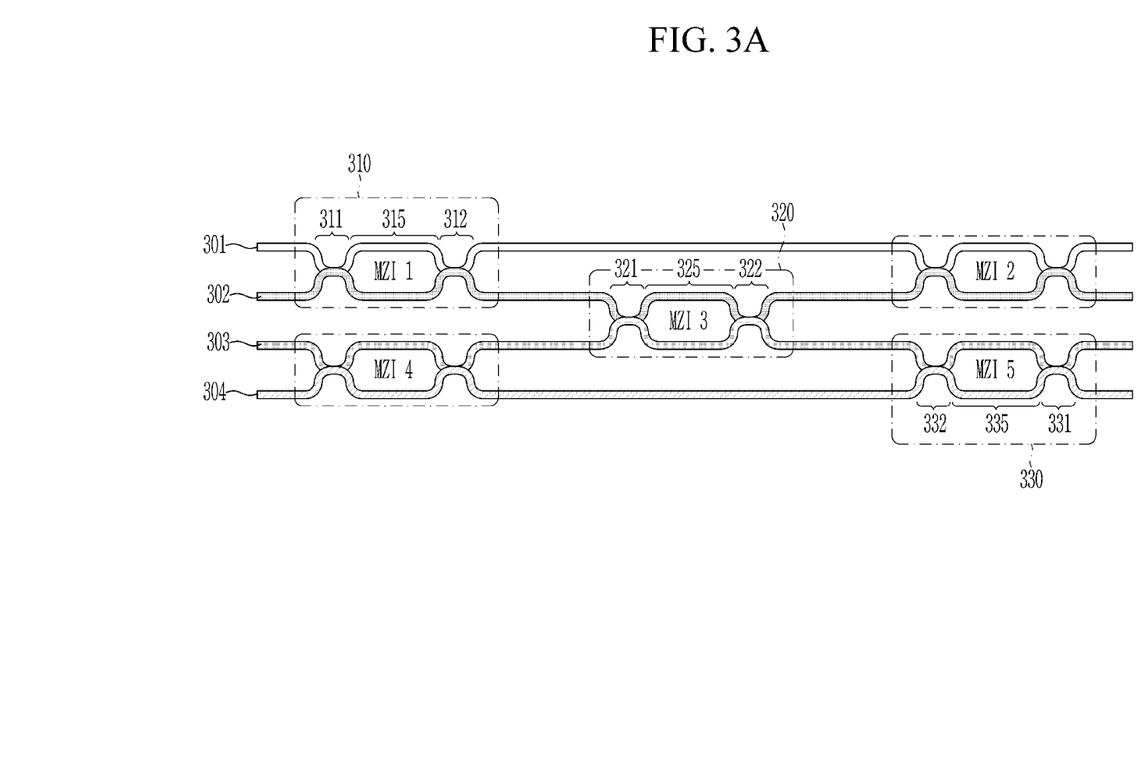
FIGS. 3A and 3B are schematic diagram illustrating a vertical DC or vertical MMI based 4×4 channel 3D optical switch according to an exemplary embodiment.
Figure 3B:
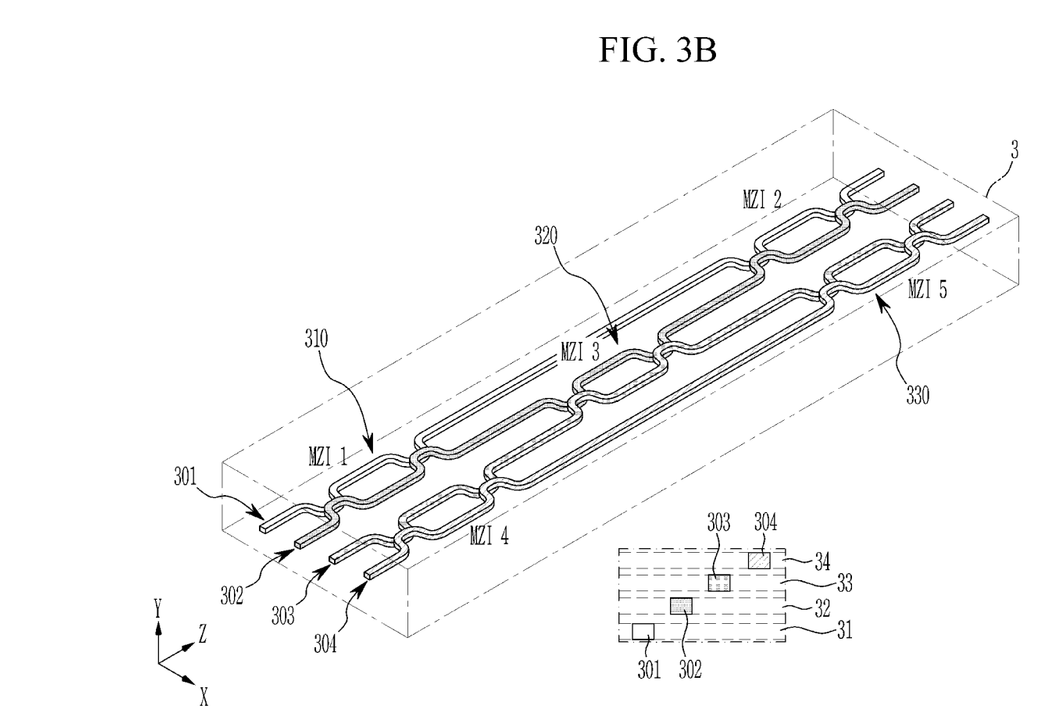

FIGS. 3A and 3B are schematic diagram illustrating a vertical DC or vertical MMI based 4×4 channel 3D optical switch according to an exemplary embodiment. The vertical DC or vertical MMI based 4×4 channel 3D optical switch according to the exemplary embodiment may be implemented in a 3D PCI in which four layers are stacked.

Referring to FIGS. 3A and 3B, the vertical DC or vertical MMI based 4×4 channel 3D optical switch according to the exemplary embodiment may include a first optical switching unit 310 and a second optical switching unit 320.

The first optical switching unit 310 may transfer an optical signal input to the first optical waveguide 301 deployed in any layer 31 of the plurality of layers to a second optical waveguide 302 deployed in a layer 32 adjacent to the layer 31.

The second optical switching unit 320 may transfer an optical signal input from the first optical switching unit 310 to a third optical waveguide 303 deployed in a layer 33 adjacent to the layer 32.

In the exemplary embodiment, a third optical switching unit 330 may transfer an optical signal input from the second optical switching unit 320 to a fourth optical waveguide 304 deployed in a layer 34 adjacent to the layer 33.

According to the vertical DC or vertical MMI based 4×4 channel 3D optical switch according to the exemplary embodiment, it is possible to switch the optical signal in four different layers.

Each of the first optical switching unit 310, the second optical switching unit 320, and the third optical switching unit 330 may include third optical couplers 311, 321, and 331, phase shifters 315, 325, and 335, and fourth optical couplers 312, 322, and 332.

The third optical couplers 311, 321, and 331 may distribute the input optical signal to the optical waveguides deployed in other layers.

The phase shifters 315, 325, and 335 may change phases of the optical signals passed through the third optical couplers 311, 321, and 331 and the optical signals distributed by the third optical couplers 311, 321, and 331. The fourth optical couplers 312, 322, and 332 may combine optical signals whose phases are changed.

The third optical couplers 311, 321, and 331 and the fourth optical couplers 312, 322, and 332 may deployed such that two optical waveguides deployed on different layers are arranged side by side in the first direction, where the first direction may be perpendicular to the different layers. The first direction may be parallel to the y-axis.

The third optical couplers 311, 321, and 331 and the fourth optical couplers 312, 322, and 332 may deployed such that two optical waveguides deployed on different layers are spaced apart by a predetermined interval in the first direction. The two optical waveguides may be formed to be bent such that a distance between the different layers is smaller than a predetermined distance. The first direction may be perpendicular to different layers. The first direction may be parallel to the y-axis. The predetermined interval and the predetermined distance may vary by the design constraints. For example, two optical waveguides may coincide with each other on the y-axis, and the interlayer spacing of the two optical waveguides may be about one layer thickness of the integrated circuit.

The phase shifters 315, 325, and 335 may be deployed such that two optical waveguides deployed on different layers are spaced apart by a predetermined interval in a second direction, and the second direction may be horizontal to the different layers. The second direction may be perpendicular to each of the first direction (y-axis) and the direction in which the optical signal is input to the first optical waveguide 301 (z-axis). The second direction may be parallel to the x-axis.

The phase shifters 315, 325, and 335 are deployed so that the two optical waveguides deployed on different layers are spaced apart by the predetermined distance in the first direction and the second direction, respectively. The two optical waveguides may be bent in a direction away from each other. The first direction may be perpendicular to the different layers, and the second direction may be perpendicular to each of the first direction (y-axis) and the direction in which the optical signal is input to the first optical waveguide 301 (z-axis). The first direction may be parallel to the y-axis, and the second direction may be parallel to the x-axis.

Although the 3D optical switch in which three optical switches are combined has been described above, the vertical DC or vertical MMI-based 4×4 channel 3D optical switch may be configured through a combination of 5 of vertical DC-based 2×2 channel 3D optical switches shown in FIG. 1. In another exemplary embodiment, the 2×2 channel 3D optical switch may be replaced with the vertical MMI-based 2×2 channel 3D optical switch shown in FIG. 2.

Figure 4:
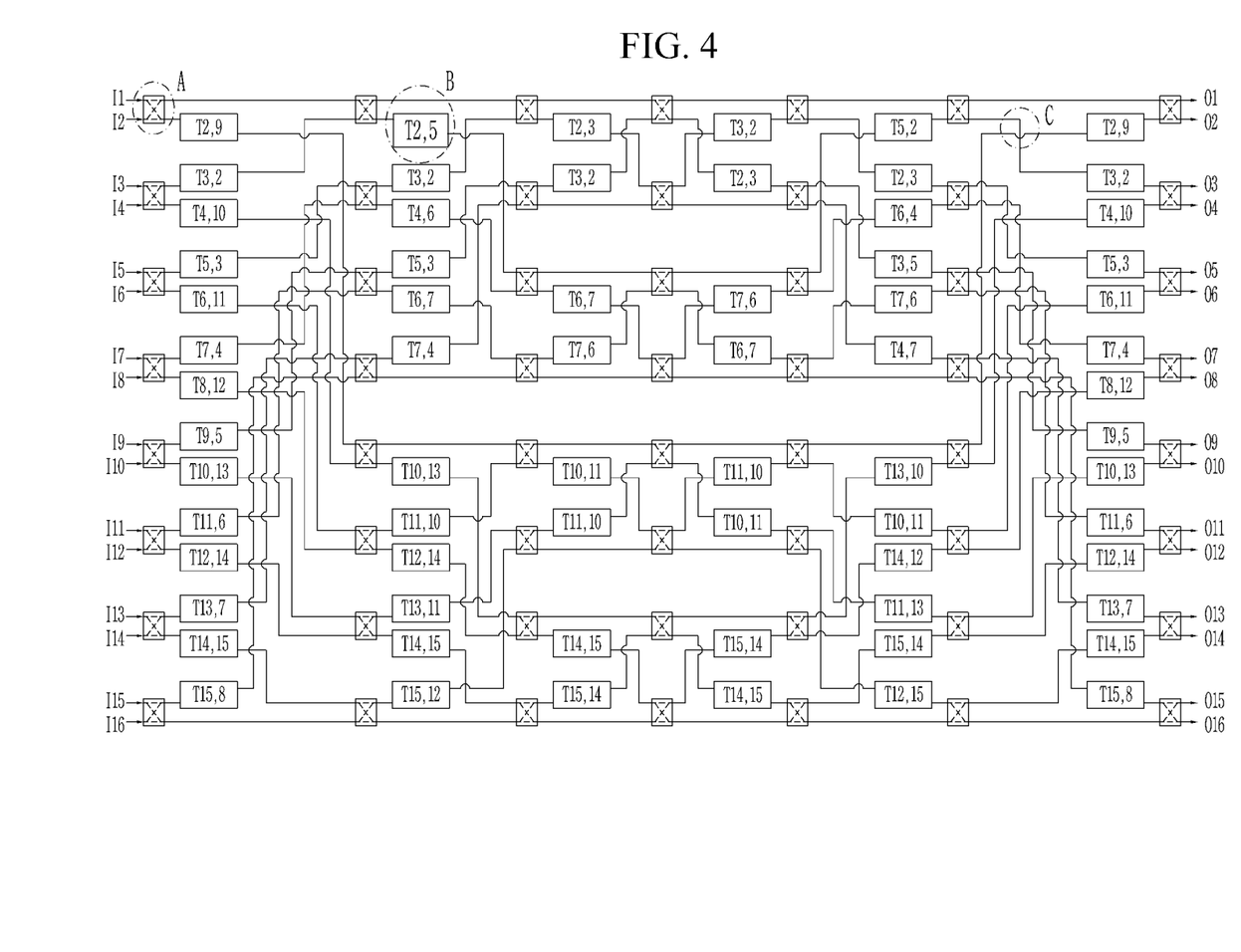
FIG. 4 is a schematic diagram illustrating a vertical DC or vertical MMI-based 16×16 channel 3D optical switch according to an exemplary embodiment.

FIG. 4 is a schematic diagram illustrating a vertical DC or vertical MMI-based 16×16 channel 3D optical switch according to an exemplary embodiment. The vertical DC or vertical MMI based 16×16 channel 3D optical switch according to the exemplary embodiment may be applied to a 3D PIC in which 16 layers are stacked.

Referring to FIG. 4, the vertical DC or vertical MMI based 16×16 channel 3D optical switch according to the exemplary embodiment may include a plurality (56) of optical switching units (A) and an interlayer coupler (B). C in FIG. 4 may indicate that the optical waveguides do not cross each other and are separated into different layers.

(T2,5) corresponding to B in FIG. 4 may represent an interlayer optical coupler for transferring an optical signal from a second layer to a fifth layer.

Since optical waveguides cross each other in a complex structure such as 16×16 channel 2D optical switches, a design that can minimize interference and loss is required. According to the vertical DC or vertical MMI based 16×16 channel 3D optical switch according to the exemplary embodiment, it is possible to design the optical waveguides so as not to cross each other, thereby minimizing interference and loss.

At the point where the optical waveguides cross, the optical waveguides are arranged in different layers. This avoids crosstalk and loss in the crossed optical waveguides.

Figure 5A:
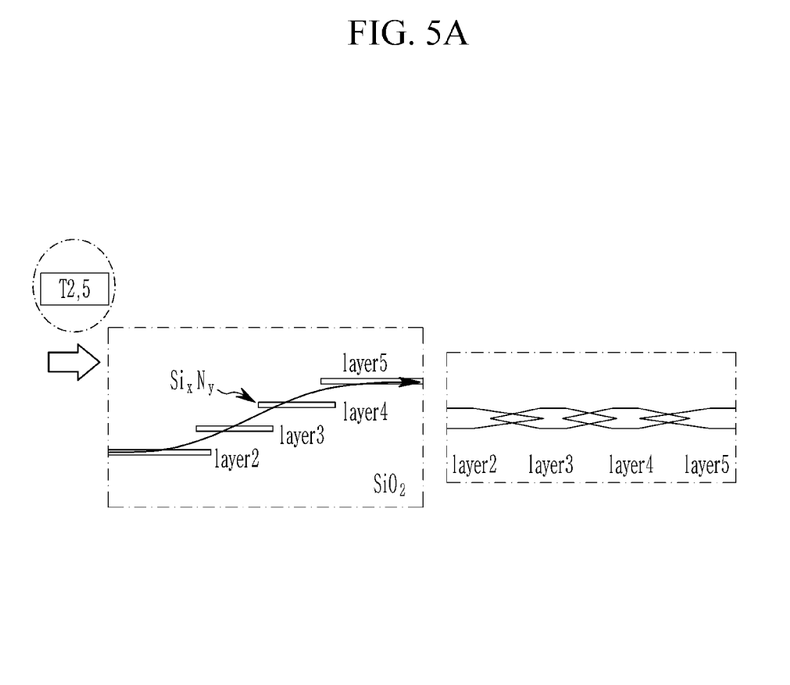
FIGS. 5A and 5B are schematic diagrams illustrating an interlayer optical coupler used in a 3D optical switch according to an exemplary embodiment.
Figure 5B:
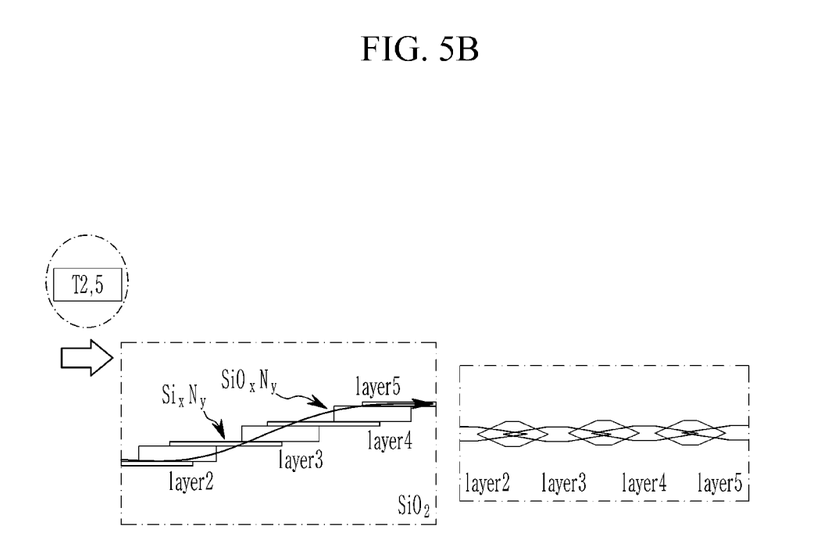

FIGS. 5A and 5B are schematic diagrams illustrating an interlayer optical coupler used in a 3D optical switch according to an exemplary embodiment.

Referring to FIGS. 5A and 5B, the optical signal input to the second layer may be sequentially optically coupled in the third layer and the fourth layer, and then moved to the fifth layer.

FIG. 3, FIG. 4, FIG. 5A, and FIG. 5B, as an exemplary embodiment, a first optical waveguide 301, a second optical waveguide 302, a third optical waveguide 303, and a fourth optical waveguide 304 may be formed with a bi-directional reverse taper structure (see FIG. 5A).

In another exemplary embodiment, a material having a different refraction index and an reverse taper shape may be inserted between the first optical waveguide 301 and the second optical waveguide 302, between the second optical waveguide 302 and the third optical waveguide 303, and between the third optical waveguide 303 and the fourth optical waveguide 304 (see FIG. 5B).

The bidirectional reverse taper structure allows for increased interlayer distances to minimize interlayer crosstalk.

Figure 6A:
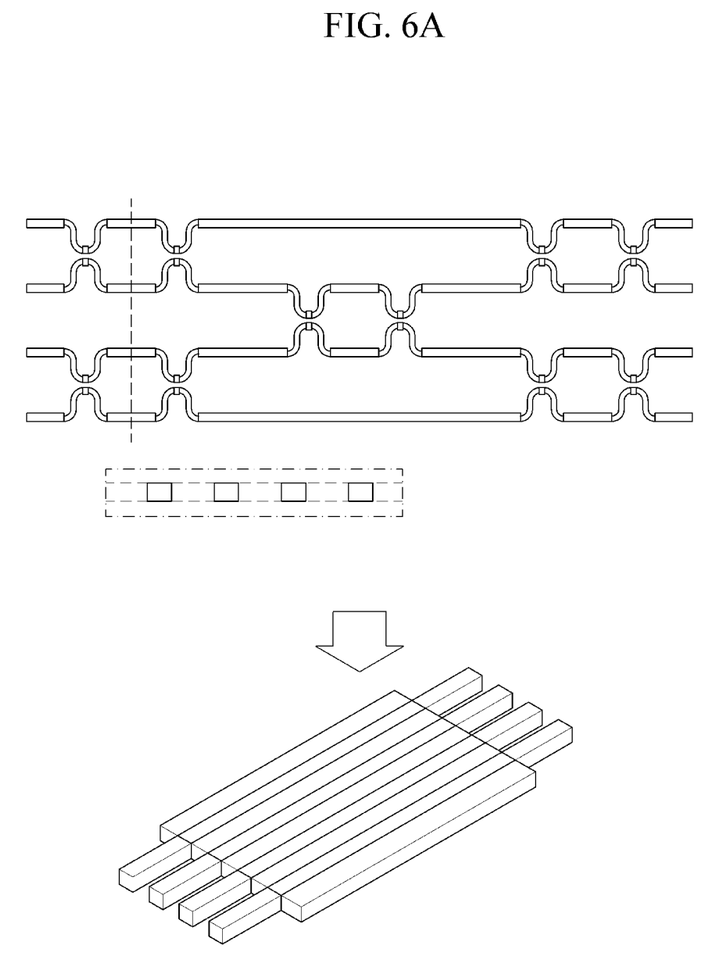
FIGS. 6A and 6B are schematic diagram illustrating 2D optical switches according to an exemplary embodiment.
Figure 6B:
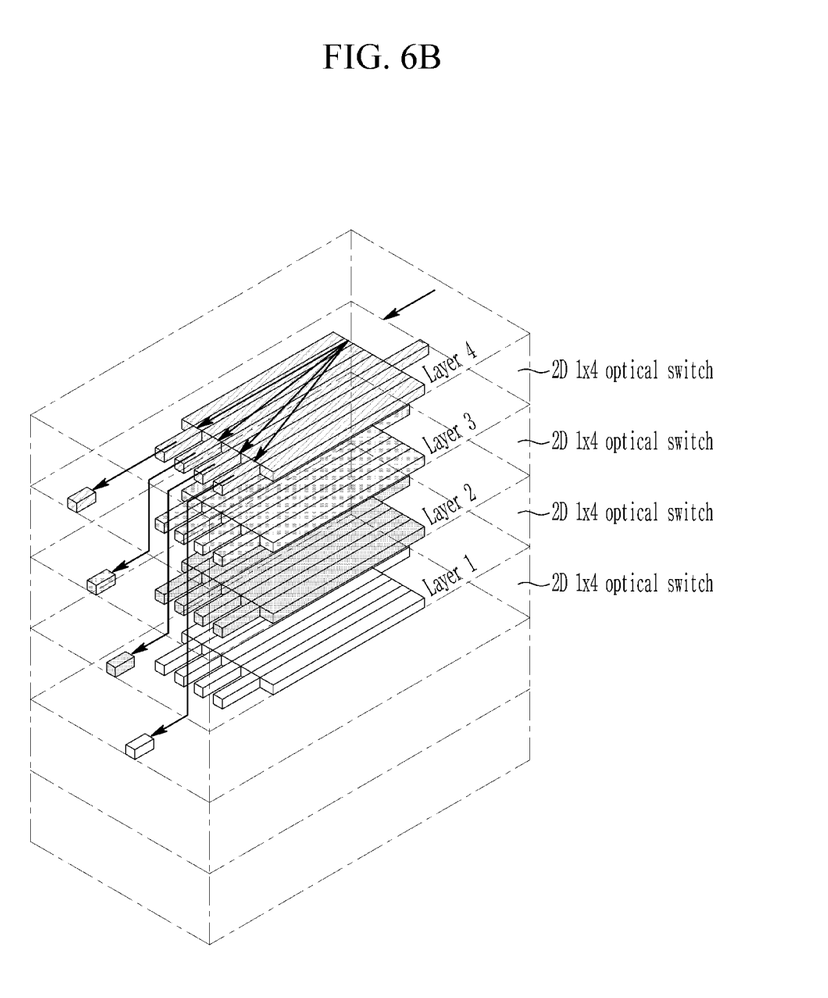
Figure 6C:
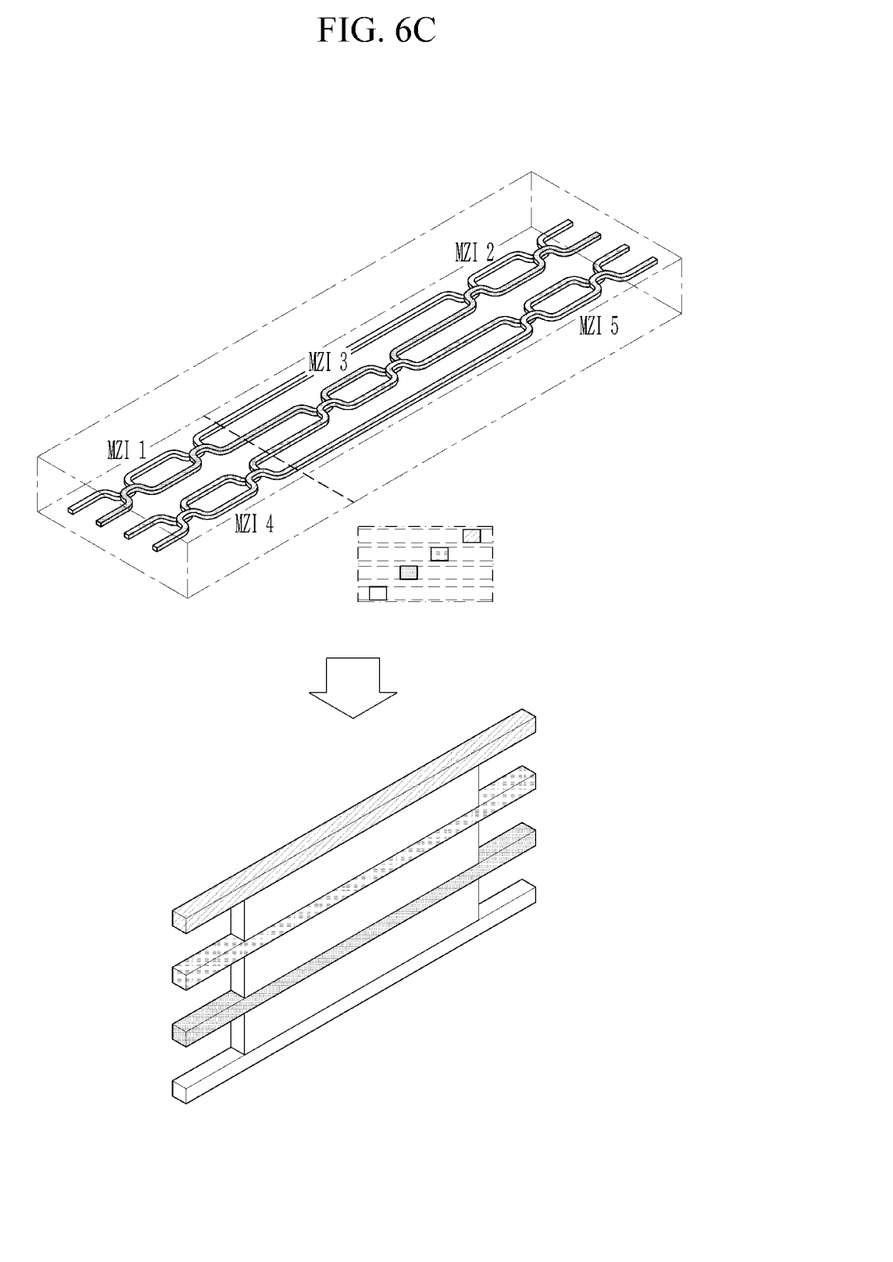
FIGS. 6C and 6D are schematic diagram illustrating 3D optical switches according to an exemplary embodiment.
Figure 6D:
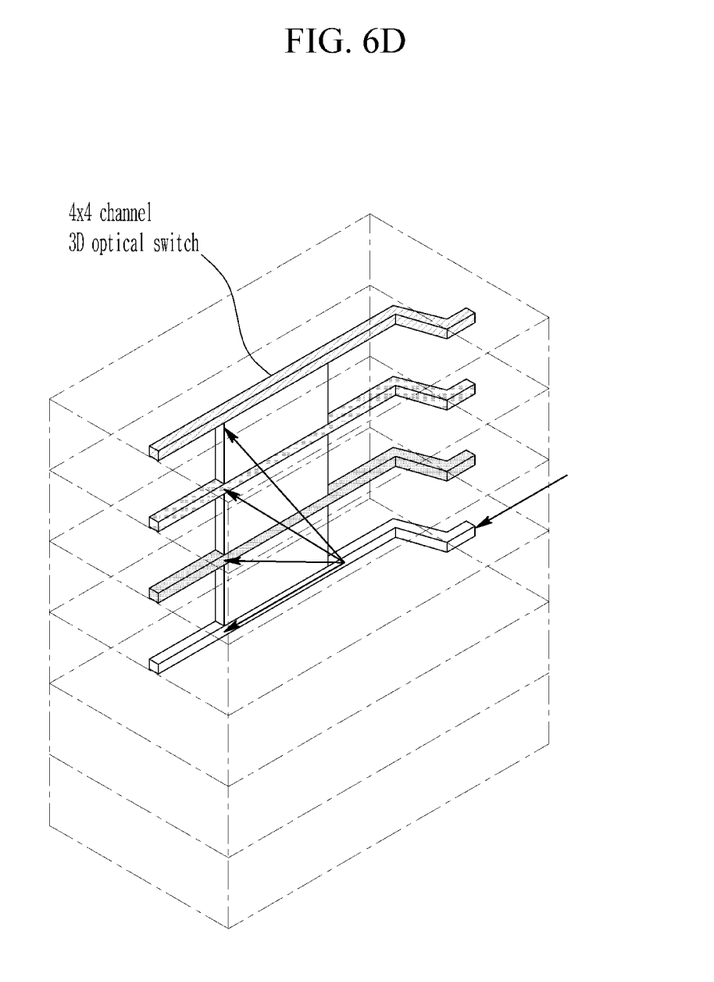

FIGS. 6A and 6B are schematic diagram illustrating 2D optical switches according to an exemplary embodiment, and FIGS. 6C and 6D are schematic diagram illustrating 3D optical switches according to an exemplary embodiment.

FIG. 6A to 6D, when implementing interlayer optical switching by applying 2D optical switches to a 3D PIC chip including four different layers, a total of four 1×4 channel optical switches are required for each layer and a total of 4 1×4 channel optical switch is required. When implementing the interlayer optical switching by applying the present disclosure, only one 4×4 channel 3D optical switch is required.

In the 3D photonic integrated circuits (PIC), optical signal switching between a PIC layer and a layer may be possible.

In addition, it is possible to increase operation efficiency through the miniaturization of the device size and the simplification of the device configuration.

Figure 7:
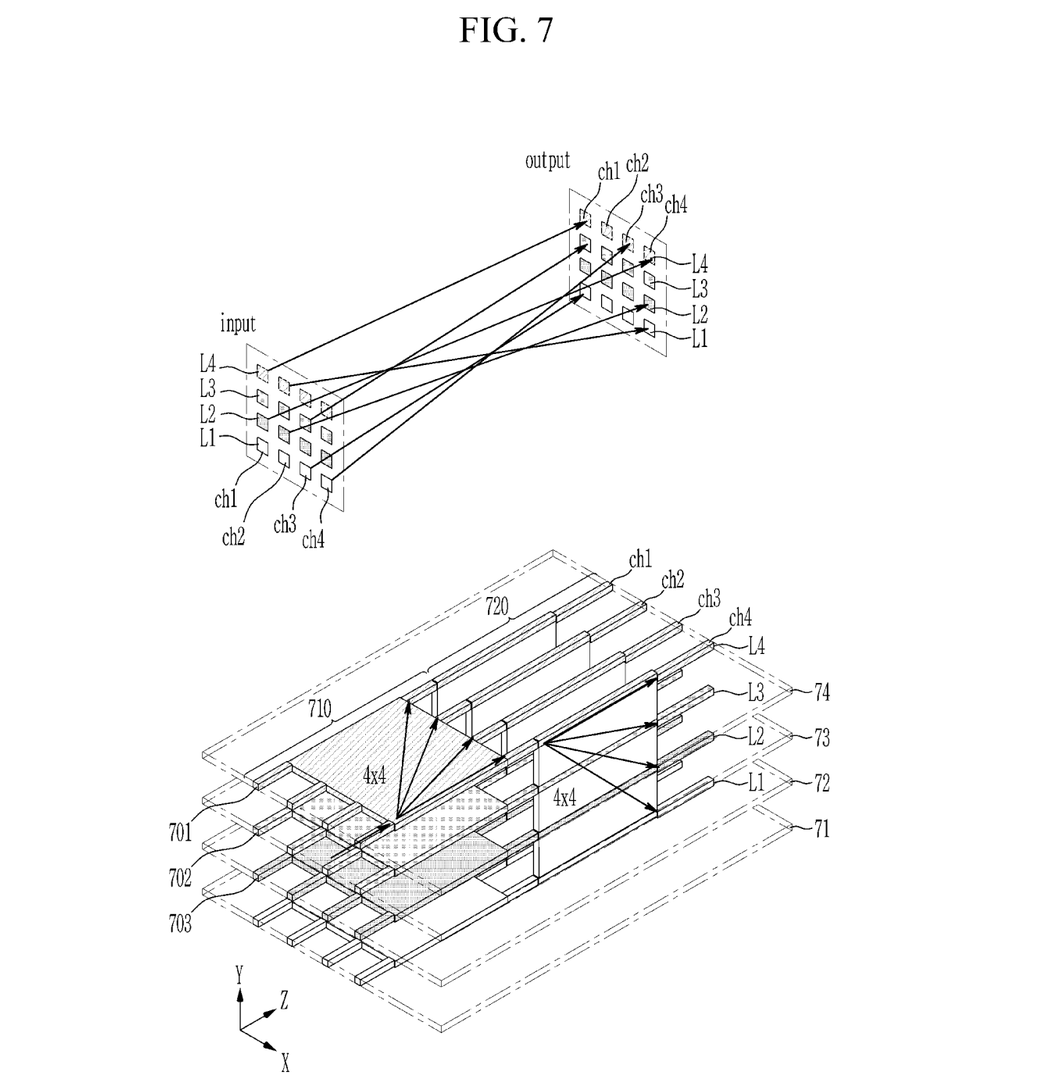
FIG. 7 is a schematic diagram illustrating a 16×16 channel 3D optical switch based on a 4×4 channel horizontal 2D optical switching unit and a 4×4 channel vertical 3D optical switching unit according to an exemplary embodiment.

FIG. 7 is a schematic diagram illustrating a 16×16 channel 3D optical switch based on a 4×4 channel horizontal 2D optical switching unit and a 4×4 channel vertical 3D optical switching unit according to an exemplary embodiment. According to the exemplary embodiment, the 16×16 channel 3D optical switch based on the 4×4 channel horizontal 2D optical switching unit and the 4×4 channel vertical 3D optical switching unit may be implemented in a 3D PIC in which four layers are stacked.

Referring to FIG. 7, the 16×16 channel 3D optical switch based on the 4×4 channel horizontal 2D optical switching unit and the 4×4 channel 3D optical switching unit according to the exemplary embodiment may include a horizontal optical switching unit 710 and a vertical optical switching unit 720.

In the exemplary embodiment, the horizontal optical switching unit 710 may transfer an optical signal input to a first horizontal optical waveguide 701 deployed in a layer 74 of the N layers to a second horizontal optical waveguide 702 deployed on the layer 74. N represents the number of layers in the PIC circuit, and N in FIG. 7 is 4.

In the exemplary embodiment, the vertical optical switching unit 720 may transfer an optical signal input from the horizontal optical switching unit 710 to a first vertical optical waveguide 703 deployed on a layer 72. In this case, the layer 72 on which first vertical optical waveguide 703 is deployed may be different from the layer 74 on which the second horizontal optical waveguide 702 is deployed.

The horizontal optical switching unit 710 and the vertical optical switching unit 720 may include N×N input ports and output ports, and the N output ports of the horizontal optical switching unit 710 may be connected to the N input ports of the vertical optical switching unit 720. In FIG. 7, since N is 4, the number of input ports and output ports is 16 (=4×4).

The optical signal input to the input port of each layer of the horizontal optical switching unit 710 may be transferred anywhere of the output port of the vertical optical switching unit 720.

The 4×4 horizontal optical switching unit 710 and the vertical optical switching unit 720 of FIG. 7 may be replaced with an N×N optical switching unit, and an $N^2 \times N^2$ channel 3D optical switch may be implemented using the N×N optical switching unit.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination. Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments. It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A three-dimensional (3D) optical switch for transferring an optical signal between optical waveguides, the 3D optical switch comprising:
   a plurality of optical waveguides; and
   a plurality of layers each of which includes at least two optical waveguides of the plurality of optical waveguides,
   wherein a vertical switching for the optical signal input to the 3D optical switch is performed in one part of the plurality of layers and a horizontal switching for the vertically switched optical signal is performed in another part of the plurality of layers,
   wherein a first optical signal is transmitted by the vertical switching from a first optical waveguide included in a first layer of the plurality of layers to a second optical waveguide included in a second layer of the plurality of layers different from the first layer; and
   a second optical signal output from the second layer is transmitted by the horizontal switching to a third optical waveguide included in the second layer.

2. The 3D optical switch of claim 1, wherein
the first optical signal is vertically transmitted from the first layer to the second layer through a first optical coupler, a phase shifter, and a second optical coupler,
wherein the first optical coupler is configured to distribute the first optical signal to the first optical waveguide and the second optical waveguide;
the phase shifter is configured to change a phase of the distributed optical signal at the first optical waveguide and the second optical waveguide; and
the second optical coupler is configured to combine the optical signals each of which the phase is changed by the phase shifter from the first optical waveguide and the second optical waveguide to generate the second optical signal.

3. The 3D optical switch of claim 2, wherein:
the first optical waveguide in the first layer is closest to the second optical waveguide in the second layer at positions of the first optical coupler and the second optical coupler by bent structures of the first optical waveguide and the second optical waveguide when the first optical waveguide and the second optical waveguide respectively extend in the first layer and the second layer in parallel.

4. The 3D optical switch of claim 2, wherein
each of the first optical waveguide deployed on the first layer and the second optical waveguide deployed on the second layer is bent in a direction toward each other at positions of the first optical coupler and the second optical coupler such that a distance between the first optical waveguide and the second optical waveguide is the smallest in the 3D optical switch.

5. A three-dimensional (3D) optical switch for transferring an optical signal between optical waveguides, the 3D optical switch comprising:
a plurality of optical waveguides; and
a plurality of layers each of which includes at least two optical waveguides of the plurality of optical waveguides,
wherein a horizontal switching for the optical signal input to the 3D optical switch is performed in one part of the plurality of layers and a vertical switching for the horizontally switched optical signal is performed in another part of the plurality of layers,
wherein a first optical signal is transmitted by the horizontal switching from a first optical waveguide included in a first layer of the plurality of layers to a second optical waveguide included in the first layer; and
a second optical signal output from the first layer is transmitted by the vertical switching to a third optical waveguide included in a second layer of the plurality of layers different from the first layer.

6. The 3D optical switch of claim 5, wherein
each of the one part of the plurality of layers for the horizontal switching and the other part of the plurality of layers for the vertical switching includes a plurality of input ports and output ports,
and the plurality of output ports of the one part for the horizontal switching are connected to the plurality of input ports of the other part for the vertical switching.

7. The 3D optical switch of claim 5, wherein
the second optical signal is vertically transmitted from the first layer to the second layer through a first optical coupler, a phase shifter, and a second optical coupler,
wherein the first optical coupler is configured to distribute the second optical signal to the second optical waveguide and the third optical waveguide, the phase shifter is configured to change a phase of the distributed optical signals at the second optical waveguide and the third optical waveguide, and the second optical coupler is configured to combine the optical signals each of which the phase is changed by the phase shifter from the second optical waveguide and the third optical waveguide to generate the vertically switched optical signal.

8. The 3D optical switch of claim 7, wherein
the second optical waveguide is closest to the third optical waveguide at positions of the first optical coupler and the second optical coupler by bent structures of the second optical waveguide and the third optical waveguide when the second optical waveguide and the third optical waveguide respectively extend in the first layer and the second layer in parallel.

* * * * *